United States Patent
Schaar

(10) Patent No.: US 6,301,985 B1
(45) Date of Patent: Oct. 16, 2001

(54) DRIVING DEVICE FOR A VEHICLE-TANK FILLER NECK

(75) Inventor: Rudolf Schaar, Mitterdorf an der Raab (AT)

(73) Assignee: Tesma Motoren-und Getriebetechnik Ges.m.b.H., Krottendorf (AT)

( * ) Notice: Subject to any disclaimer, the term of this patent is extended or adjusted under 35 U.S.C. 154(b) by 0 days.

(21) Appl. No.: 09/416,627

(22) Filed: Oct. 12, 1999

(30) Foreign Application Priority Data

Oct. 12, 1998 (AT) ................................................ 1703/98

(51) Int. Cl.$^7$ ............................................................ F16U 5/08
(52) U.S. Cl. ................................ 74/405; 220/86.2; 141/94
(58) Field of Search .............................. 74/405, 406, 425, 74/116, 119, 122, 124, 125.5, 137, 10.32, 337.5; 220/86.2, 86.3, DIG. 33, 315; 141/94; 296/97.22; 352/166; 242/67.2; 65/29; 292/144

(56) References Cited

U.S. PATENT DOCUMENTS

| | | | | | |
|---|---|---|---|---|---|
| 3,802,770 | * | 4/1974 | Betts | ..................................... | 352/166 |
| 3,901,407 | * | 8/1975 | Mitchell et al. | ..................... | 220/315 |
| 4,494,707 | * | 1/1985 | Niibori et al. | ....................... | 242/67.2 |
| 4,704,152 | * | 11/1987 | Davey | ...................................... | 65/29 |
| 4,945,780 | * | 8/1990 | Bosma | ................................. | 74/337.5 |
| 5,385,256 | * | 1/1995 | Brown | ....................... | 220/DIG. 33 X |
| 5,533,766 | * | 7/1996 | Farber | ................................... | 292/144 |
| 5,921,424 | * | 7/1999 | Palvolgyi | ............................ | 220/86.2 |
| 5,988,238 | * | 11/1999 | Palvolgyi | .......................... | 22/86.2 X |
| 6,056,140 | * | 5/2000 | Muth et al. | .................... | 220/DIG. 33 |

* cited by examiner

Primary Examiner—David A. Bucci
Assistant Examiner—Colby Hansen
(74) Attorney, Agent, or Firm—Bachman & LaPointe, P.C.

(57) ABSTRACT

Driving device for a closing arrangement of a vehicle-tank filler neck, having a housing (1), an input shaft (2), which is intended for the connection of a drive motor (3), an output shaft (5), which is intended for driving the closing arrangement, and a gear mechanism (11, 12) which is arranged in the housing (1) and acts between the input shaft (2) and the output shaft (5), the gear mechanism (11, 12) being a worm wheel/worm mechanism with a self-locking action in the direction from the output shaft to the input shaft, a clutch (13–17) being arranged between the gear mechanism (11, 12) and the output shaft (5), and a manual actuating arrangement (18–24) with a predetermined actuating travel being provided which, over a first part (FIGS. 3b–4b) of the actuating travel, moves the clutch (13–17) into the disengaged position and, over a second part (FIGS. 4b–4c) of the actuating travel, drives the output shaft (5).

8 Claims, 4 Drawing Sheets

DRIVING DEVICE FOR A VEHICLE-TANK FILLER NECK

BACKGROUND OF THE INVENTION

The present invention relates to a driving device for a closing arrangement of a vehicle-tank filler neck.

Closing arrangements that can be actuated by means of a driving device and are intended for vehicle-tank filler necks are described, for example, in AT 403 141, AT 403 563 or DE 43 40 418. Such closing arrangements use either what is referred to as the "lead-free flap" or separate shut-off valves within the filler neck as an alternative to the well-known filler caps to allow the neck to be closed after refueling. The mouth of the filler neck and the closing arrangement are situated in a set-back area of the vehicle body which is covered, during driving, by a body flap which ends flush with the body.

These closing systems are particularly suitable for use in robotic fueling systems in which the driver unlocks the closing arrangement remotely without leaving the driver's seat, possibly also at the same time opening the body flap to allow the robotic fuel pump nozzle to start the refueling operation immediately.

The driving device for the closing arrangement must meet various requirements. On the one hand, it must be ensured for safety reasons that the closing arrangement does not open unintentionally when shocks occur or in the event of a crash and that it offers sufficient resistance to unauthorized attempts at entry, and, on the other hand, for reasons of operational reliability and maintenance, it should also be possible to actuate it quickly and simply by hand when necessary, even if the drive motor, i.e. the electronics, pneumatics, hydraulics or the like, fail completely. It is the aim of the present invention to unite these different requirements.

SUMMARY OF THE INVENTION

According to the invention, the foregoing is achieved in the case of a driving device of the type stated above by virtue of the fact that the gear mechanism is a worm wheel/worm mechanism with a self-locking action in the direction from the output shaft to the input shaft, a clutch is arranged between the gear mechanism and the output shaft, and a manual actuating arrangement with a predetermined actuating travel is provided which, over a first part of the actuating travel, moves the clutch into the disengaged position and, over a second part of the actuating travel, drives the output shaft.

The use of a self-locking worm gear mechanism ensures effective locking of the closing device in the driveless state in a particularly simple manner that is not susceptible to faults; however, the locking can be deactivated at any time by means of the clutch and the manual actuating arrangement in order to allow emergency operation if the drive motor fails.

A particularly compact structure can be achieved for the gear mechanism and the clutch by means of a preferred embodiment which comprises the worm of the gear mechanism being connected in a rotationally fixed manner to the input shaft and the worm wheel of the gear mechanism being rotatably mounted on the output shaft, and the clutch having an engagement part which is mounted in a rotationally fixed and axially moveable manner on the output shaft, is preloaded by a spring into engagement in the worm wheel, and can be disengaged by a tappet used as a control mechanism for the clutch.

According to another preferred embodiment of the invention, it is envisioned that the manual actuating arrangement comprises a cam disc rotatably mounted on the output shaft and having a guide ramp, and the clutch is controlled by a tappet, which, over said first part of the actuating travel, slides up the guide ramp, opening the clutch in the process.

In this arrangement, the output shaft is preferably provided with a driver pin and the control cam is preferably provided with a stop which interacts with it and takes the driver pin along over said second part of the actuating travel.

The use of a rotatable cam disc with a first and a second cam section corresponding to the first and the second part of actuation makes it possible to achieve the emergency manual actuating function in a particularly simple and compact manner.

Another embodiment of the invention, which furthermore also serves to drive a vehicle body flap covering the filler neck comprises a linkage, one end of which is intended for connection to the body flap and the other end of which is actuated by the output shaft via a cam. By means of this linkage it is possible to vary and adjust the point of installation of the device relative to the vehicle body flap.

Moreover, a linkage/cam arrangement of this kind makes it possible to construct a torque sensor if the cam is rotatably spring-mounted on the output shaft, a sensor switch being provided which responds to a relative rotation between the cam and the output shaft and is suitable for controlling the drive motor. This makes it possible to provide a self- and/or emergency deactivation function for the flap drive: an excessive torque occurs, for example, once the end position of the pivoting motion of the flap has been reached, in which case the motor switches off automatically, or when there is an obstacle in the pivoting path of the flap, thus eliminating the risk that the user's fingers will be trapped as the flap closes.

It is particularly advantageous if the sensor switch is formed by two pressure switches which are mounted facing one another on the cam and between which a finger carried on the output shaft engages. It is, of course, also possible to use any other form of known sensor switch instead of this particularly simple solution.

The rotational springing arrangement for the cam relative to the output shaft is preferably formed by two compression springs which are mounted facing one another on the cam and between which said finger engages, so that the same finger is used both for the rotational springing arrangement and for the torque sensor.

In each of the above embodiments of the invention, the device can furthermore comprise a return spring-which acts on the output shaft. This allows the manual actuating arrangement to be embodied in such a way that it acts in only one direction, i.e. in a direction from the first part to the second part of the actuating travel, because the return spring closes the body flap when the actuating arrangement is released. A manual actuating arrangement of this kind, which exhibits positive engagement in only one direction, has the advantage that the body flap remains motionless during motor operation.

It is particularly advantageous if the output shaft passes through the housing and the return spring is a pretensionable coil-spring energy storage device which can be flanged to the housing in engagement with one end of the output shaft, this considerably simplifying installation.

BRIEF DESCRIPTION OF THE DRAWINGS

The invention will be explained in greater detail below with reference to an embodiment example illustrated in the drawings, wherein.

DETAILED DESCRIPTION

Figure 2:
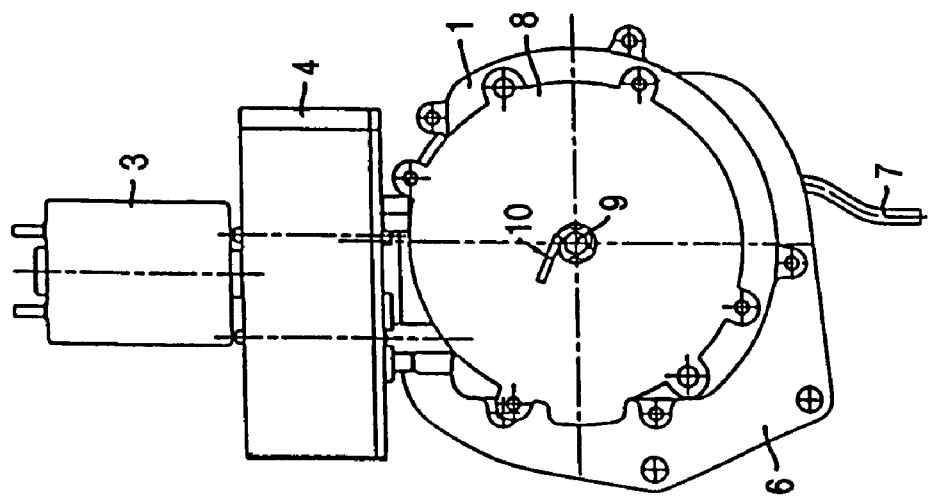
FIG. 2 shows the device in an end view.
Figure 1:
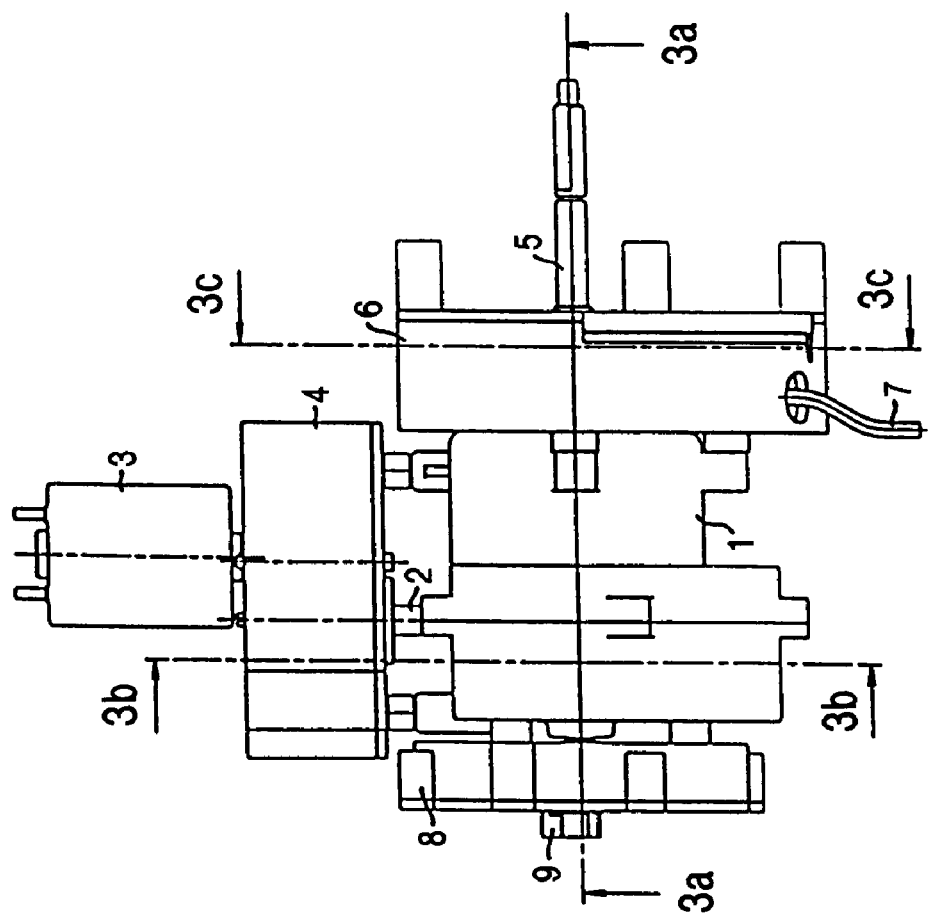
FIG. 1 shows the device according to the invention in side view.

According to FIGS. 1 and 2, the device comprises a housing 1 into which an input shaft 2 for connecting up a drive motor 3 with a reduction gear unit 4 enters on one side. Also passing through the housing 1 is an output shaft 5, which is intended for driving a closing arrangement (not shown) of a vehicle-tank filler neck. A closing arrangement of this kind can, for example, be embodied in the manner described in AT 403 141 and can comprise a pressing finger which, in the closed position, presses against the underside of the lead-free flap at the end of the filler neck and thereby locks said flap. In this case, the end of the output shaft 5 drives the pivot of the pressing finger directly. Other kinds of closing arrangements include, for example, a ball-type shut-off valve in the filler neck, the end of the output shaft 5 in this case driving the spindle of the shut-off ball.

The output shaft 5 also drives a body flap (likewise not shown) of the type usually used to cover an offset area of a vehicle body in which access can be gained to the end of the vehicle-tank filler neck. The output shaft 5 can drive the pivot of the body flap directly or, as in the case shown, can drive the body flap at a point remote from its pivot by means of a crank mechanism, denoted in general by 6, and a linkage 7, part of which is shown.

In the case shown, the crank mechanism 6 is arranged in its own housing, through which the output shaft 5 passes and which is flanged to the housing 1. That end of the output shaft 5 which projects from the housing can then be used to drive the filler-neck closing arrangement.

Flanged to the opposite side of the housing 1 is a coil-spring energy storage device 8 which engages in the end of the output shaft 5 emerging at that point, e.g. by means of a socket-type connection. The coil-spring energy storage device 8 is used to preload the output shaft 5 in the closing direction of the closing arrangement and of the body flap and is pre-tensioned before assembly. For this purpose, the outwardly protruding hub 9 of the spring energy storage device 8 is provided with external teeth into which a detent pawl 10 engages during the pre-tensioning operation, said pawl being snapped off after the installation of the device.

Figure 3C:
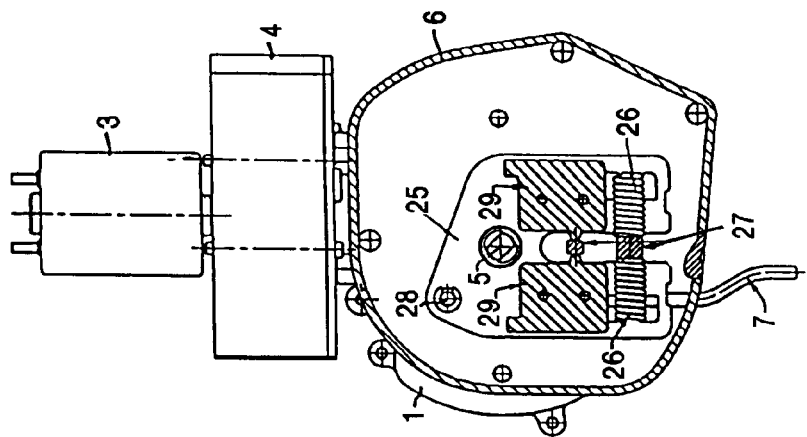
FIGS. 3a–3c show sectional views of the device in one operating position, namely in the engaged position for the motor drive.
Figure 3B:
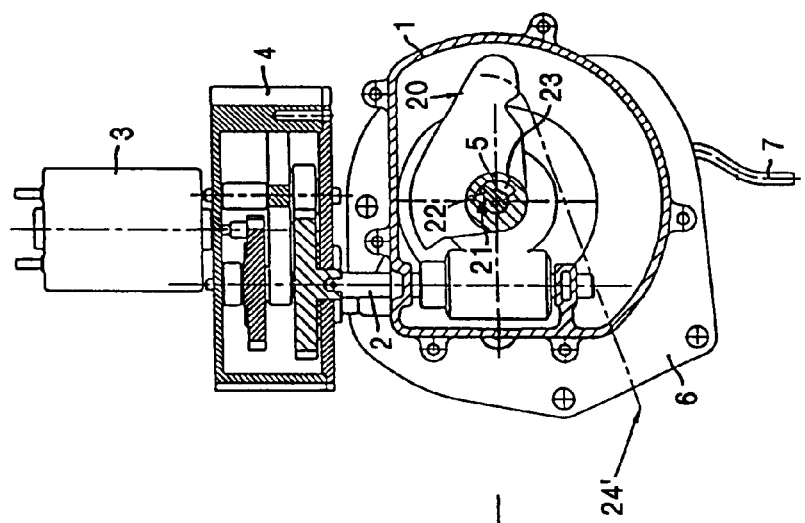
Figure 3A:
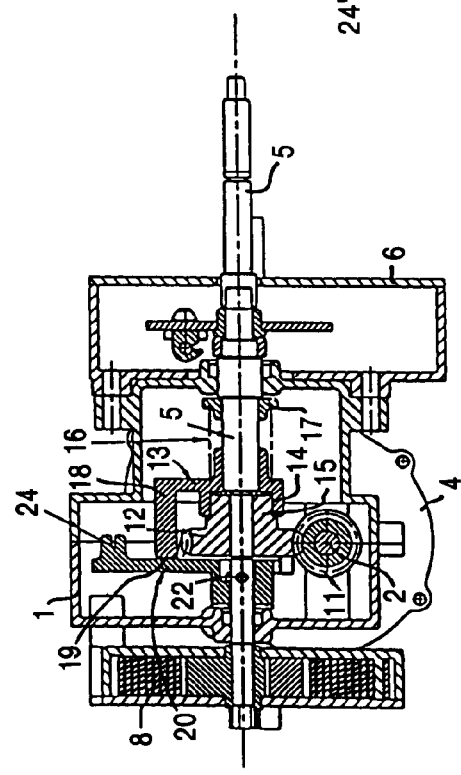

According to FIG. 3a, the input shaft 2 is provided with a worm 11 which drives a worm wheel 12, which is mounted rotatably on the output shaft 5. An engagement part 13, which is mounted in a rotationally fixed manner on the output shaft 5, engages in the worm wheel 12, more specifically by means of internal teeth 14 and corresponding external teeth on a hub extension 15 of the worm wheel 12.

The engagement part 13 is mounted on the output shaft 5 in such a way that it can be moved in the axial direction, and it is loaded in the direction of engagement with the worm wheel 13 by means of a compression spring 16 supported via a guide washer 17 on the inside of the housing 2.

In the operating position of the motor shown in FIGS. 3a to 3c, the torque is transmitted from the motor 3 to the output shaft 5 via the worm 11, the worm wheel 12 and the engagement part 13.

Figure 4B:
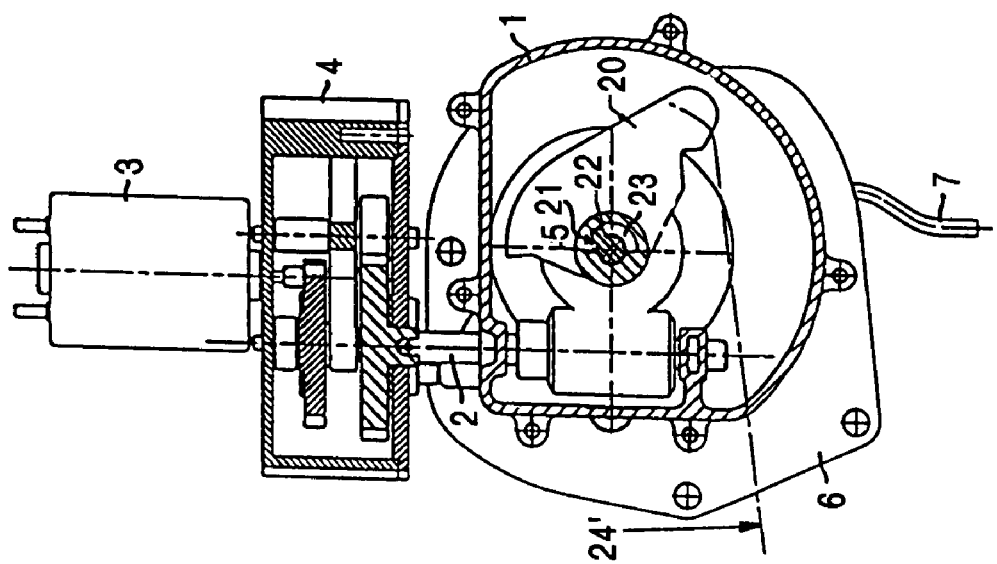
FIGS. 4a and 4b show sectional views of the device in a second operating position, namely after the manual actuating arrangement has been moved over a first part of the actuating travel into the disengaged state.
Figure 4A:
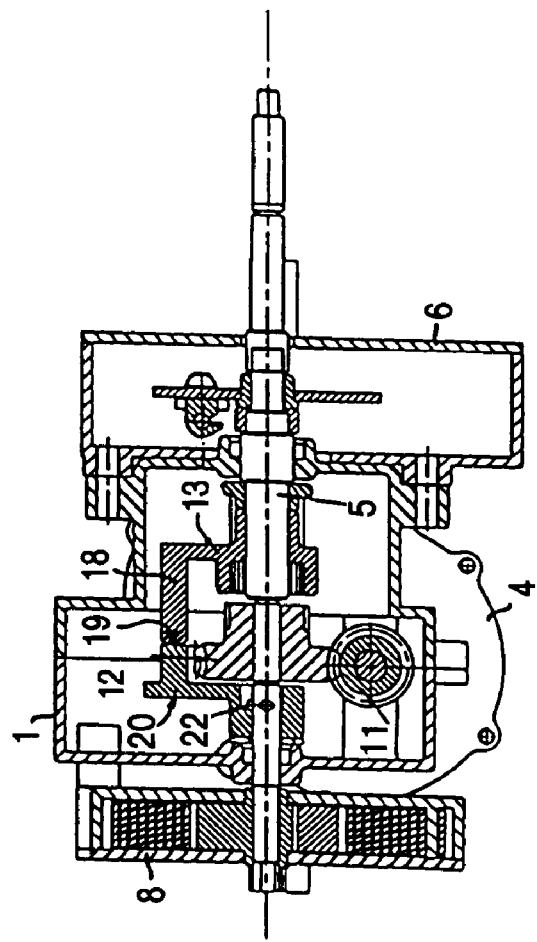

For manual actuation, in the event, for example, of the motor 3 failing, the following arrangement is used. The worm wheel 12 and the engagement part 13 form a clutch. For the purpose of controlling the clutch, the engagement part 13 is provided with a tappet 18 which is parallel to the axis and slides on a guide ramp 19 provided in the axial direction by a cam plate 20 mounted rotatably on the output shaft 5. When the cam plate 20 is rotated over a first part of its actuating travel, or specifically from the position shown in FIG. 3b into the position shown in FIG. 4b, the engagement part 13 is moved by the tappet 18 from the position shown in FIG. 3a into the position shown in FIG. 4a, in which it is raised from the worm wheel 12, i.e. the clutch is disengaged. If the cam disc 20 is rotated further, over a subsequent second part of its actuating travel, more specifically from the position shown in FIG. 4b into the position shown in FIG. 5b, the position of the clutch no longer changes since, in this part, the height of the guide ramp 19 remains constant (see FIGS. 4a, 5a). However, a stop 21 formed on the cam disc 20 now takes along a driver pin 22 connected to the output shaft 5 (see FIG. 4b, 5b), with the result that the output shaft 5 is rotated.

The stop 21 is formed within a cutout 23 in the hub of the cam disc 20. This cutout 23 is extended in the circumferential direction on the side of the driver pin 22 opposite the stop 21 to ensure that the control disc 20 does not accompany the movement of the output shaft 5 when the motor is in operation (FIG. 3).

The cam disc 20 can-project from the housing 1 or be actuated by means of a Bowden cable 24' (illustrated only schematically) which engages on a peripheral tab 24 on the control cam 20.

When the manual actuating arrangement is relieved of load, the force of the coil-spring energy storage device 8 acts on the output shaft 5 and pivots the output shaft 5 back into the rest position, FIG. 3. The control cam 20 is turned back into the initial position by means of a spring of the Bowden cable 24', for example. As a result, the tappet 18 slides down the guide ramp 19 and the positive engagement between the engagement part 13 and the worm wheel 12 is re-established. The system is ready for motor driving or manual actuation again.

Figure 5C:
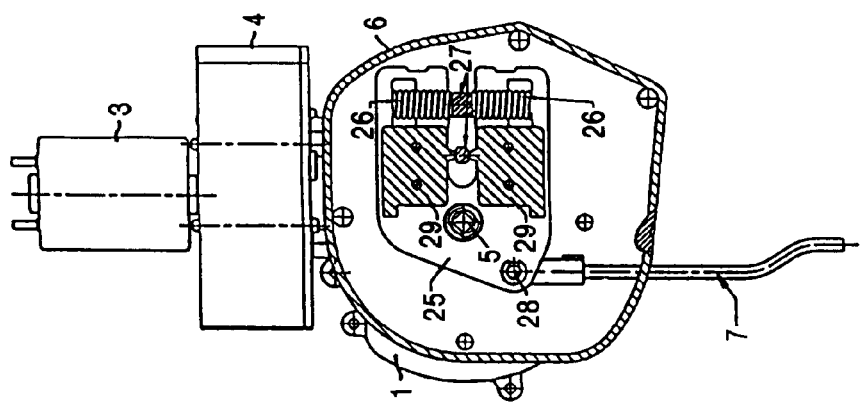
FIGS. 5a–5c show sectional views of the device in a third operating position, namely at the end of the second part of the actuating travel of the manual actuating arrangement.
Figure 5B:
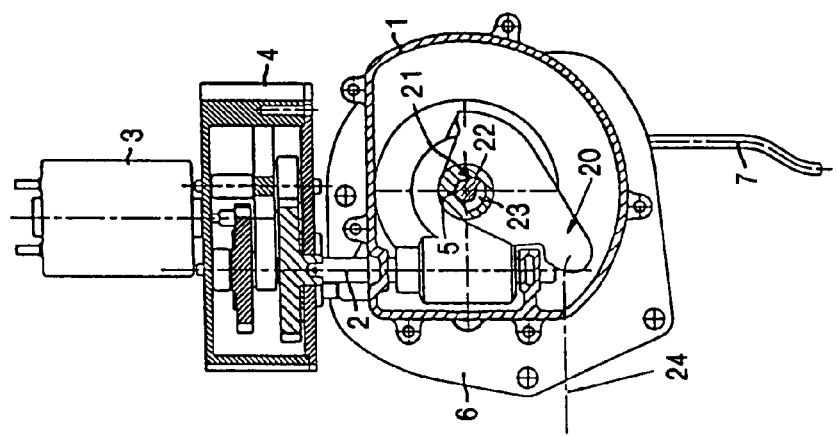
Figure 5A:
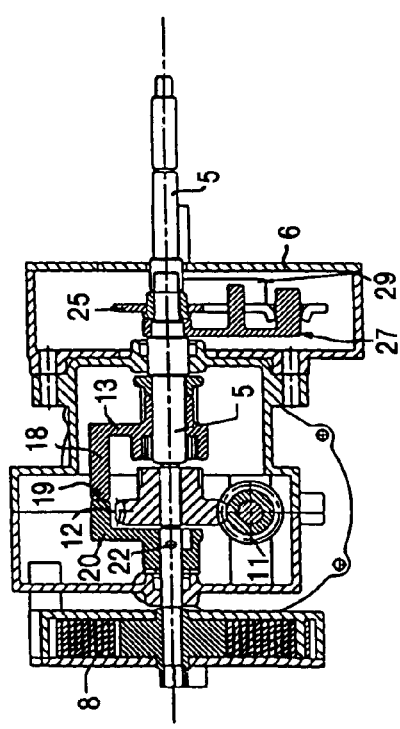

FIGS. 3c and 5c show the crank mechanism 6 in detail. The crank mechanism comprises a plate-shaped cam 25 which is rotatably spring-mounted on the output shaft 5. The rotatable spring-mounting is achieved by means of two compression springs 26 mounted facing one another on the cam 25, between which there engages a finger 27 which is taken along in rotation by the output shaft 5 (FIG. 5a). The linkage 7 is coupled to one end of the cam 25, at 28.

The rotatable spring-mounting of the cam 25 on the output shaft 5 results in a spring-force-dependent relative motion between the cam 25 and the shaft 5 which is used to measure the torque or the force applied to the linkage 7. For this purpose, the cam 25 is provided with a sensor switch in the form of two mutually facing pressure switches 29 between which the finger 27 engages. When the torque or the force applied to the linkage 7 exceeds a predetermined spring force, the corresponding pressure switch 29 is actuated. This can be used for limit-switching the motor 3 when the body flap (not shown) has reached its end position, or as an anti-trap safeguard for the fingers of the user when the flap is closed by motor, or as a trigger for the motor-operated closure of the flap by simply nudging the opened flap in the closing direction. One pressure switch 26 and/or the other is used as the on and/or off switch as appropriate.

The worm wheel/worm mechanism 11, 12 is designed to be self-locking in the direction from the output shaft 5 to the input shaft 2 and is used as a means of locking the system both in the open and in the closed state of the closing arrangement and the body flap. This also serves as a means of damping relative to the spring energy store and during the closing operation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A driving device for a closing arrangement of a vehicle-tank filler neck, comprising:

a housing;

an input shaft connected to a drive motor;

an output shaft for driving the closing arrangement; and a gear mechanism which is arranged in the housing and acts between the input shaft and the output shaft, wherein the gear mechanism is a worm wheel/worm mechanism with a self-locking action in the direction from the output shaft to the input shaft, and wherein a clutch is arranged between the gear mechanism and the output shaft, and wherein actuating means with a predetermined actuating travel is provided which, over a first part of the actuating travel, moves the clutch into a disengaged position and, over a second part of the actuating travel, drives the output shaft wherein the worm of the gear mechanism is connected in a rotationally fixed manner to the input shaft and the worm wheel of the gear mechanism is rotatably mounted on the output shaft, wherein the clutch has an engagement part which is mounted in a rotationally fixed and axially moveable manner on the output shaft, is preloaded by a spring into engagement in the worm wheel, and can be disengaged by a tappet used as a control mechanism for the clutch, and wherein the actuating means comprises a cam disc rotatably mounted on the output shaft and having a guide ramp, and wherein the clutch is controlled by the tappet, which, over said first part of the actuating travel, slides up the guide ramp, opening the clutch in the process.

2. The device as claimed in claim 1, wherein the output shaft is provided with a driver pin and the control cam is provided with a stop which interacts with it and takes the driver pin along over said second part of the actuating travel.

3. The device as claimed in claim 1 including wherein the output shaft for driving the closing arrangement further includes means for driving a vehicle body flap covering the filler neck, which means comprises a linkage, one end of which is intended for connection to the body flap and the other end of which is actuated by the output shaft via a cam.

4. The device as claimed in claim 3, wherein the cam is rotatably spring-mounted on the output shaft, a sensor switch being provided with means which respond to a relative rotation between the cam and the output shaft and is suitable for controlling the drive motor.

5. The device as claimed in claim 4, wherein the sensor switch is formed by two pressure switches which are mounted facing one another on the cam and between which a finger carried on the output shaft engages.

6. The device as claimed in claim 5, wherein the means which respond to a relative rotation include a rotational springing arrangement for the cam relative to the output shaft which is formed by two compression springs which are mounted facing one another on the cam and between which said finger engages.

7. The device as claimed in claim 1, which comprises a return spring which acts on the output shaft.

8. The device as claimed in claim 7, wherein the output shaft passes through the housing and the return spring is a pretensionable coil-spring energy storage device which can be flanged to the housing in engagement with one end of the output shaft.

\* \* \* \* \*